United States Patent
Freund, Jr. et al.

(10) Patent No.: US 6,816,808 B2
(45) Date of Patent: Nov. 9, 2004

(54) PEAK SWITCH DETECTOR FOR TRANSIT TIME ULTRASONIC METERS

(75) Inventors: William R. Freund, Jr., Houston, TX (US); Klaus Joachim Zanker, Houston, TX (US); Gail Paulin Murray, Tomball, TX (US)

(73) Assignee: Daniel Industries, Inc., Houston, TX (US)

( * ) Notice: Subject to any disclaimer, the term of this patent is extended or adjusted under 35 U.S.C. 154(b) by 0 days.

(21) Appl. No.: 10/038,947

(22) Filed: Jan. 3, 2002

(65) Prior Publication Data

US 2003/0125902 A1 Jul. 3, 2003

(51) Int. Cl.⁷ .............................................. G04G 5/00
(52) U.S. Cl. ..................................................... 702/178
(58) Field of Search ........................... 702/178; 73/597, 73/861, 584, 644, 861.78; 351/218, 205; 374/131, 159; 156/73; 368/118; 228/110; 123/417; 314/508

(56) References Cited

U.S. PATENT DOCUMENTS

| 4,626,110 A | * | 12/1986 | Wickersheim et al. | 374/131 |
| 4,930,358 A | * | 6/1990 | Motegi et al. | 73/861.28 |
| 5,280,728 A | * | 1/1994 | Sato et al. | 73/861.28 |
| 6,494,105 B1 | | 12/2002 | Gallagher | 73/861.27 |
| 2002/0062690 A1 | | 5/2002 | Kobayshi et al. | 72/204.27 |

OTHER PUBLICATIONS

International Search Report for International Application No. PCT/US03/20835 dated Dec. 6, 2003 (4 p.).

* cited by examiner

*Primary Examiner*—John Barlow
*Assistant Examiner*—Tung S Lau
(74) *Attorney, Agent, or Firm*—Conley Rose, P.C.

(57) ABSTRACT

A method is disclosed to identify peak switching errors in an ultrasonic meter and how to correct for them. The method compares transit time measurements from two chords having different lengths to establish an error value. Depending on the magnitude and sign of the error value, any peak switching error can be identified and consequently corrected.

21 Claims, 6 Drawing Sheets

PEAK SWITCH DETECTOR FOR TRANSIT TIME ULTRASONIC METERS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

A disclosed embodiment of the invention relates generally to the detection of errors in ultrasonic transit time measurements. Even more particularly, a disclosed embodiment of the invention relates to the identification of mistakes in peak selection for the ultrasonic waveforms.

2. Description of the Related Art

After a hydrocarbon such as natural gas has been removed from the ground, the gas stream is commonly transported from place to place via pipelines. As is appreciated by those of skill in the art, it is desirable to know with accuracy the amount of gas in the gas stream. Particular accuracy for gas flow measurements is demanded when gas (and any accompanying liquid) is changing hands, or "custody." Even where custody transfer is not taking place, however, measurement accuracy is desirable.

Gas flow meters have been developed to determine how much gas is flowing through the pipeline. An orifice meter is one established meter to measure the amount of gas flow. Certain drawbacks with this meter existed, however. More recently, another type of meter to measure gas flow was developed. This more recently developed meter is called an ultrasonic flow meter.

FIG. 1A shows an ultrasonic meter suitable for measuring gas flow. Spoolpiece 100, suitable for placement between sections of gas pipeline, has a predetermined size and thus defines a measurement section. Alternately, a meter may be designed to attach to a pipeline section by, for example, hot tapping. As used herein, the term "pipeline" when used in reference to an ultrasonic meter may be referring also to the spoolpiece or other appropriate housing across which ultrasonic signals are being sent. A pair of transducers 120 and 130, and their respective housings 125 and 135, are located along the length of spoolpiece 100. A path 110, sometimes referred to as a "chord" exists between transducers 120 and 130 at an angle $\theta$ to a centerline 105. The position of transducers 120 and 130 may be defined by this angle, or may be defined by a first length L measured between transducers 120 and 130, a second length X corresponding to the axial distance between points 140 and 145, and a third length D corresponding to the pipe diameter. Distances D, X and L are precisely determined during meter fabrication. Points 140 and 145 define the locations where acoustic signals generated by transducers 120 and 130 enter and leave gas flowing through the spoolpiece 100 (i.e. the entrance to the spoolpiece bore). In most instances, meter transducers such as 120 and 130 are placed a specific distance from points 140 and 145, respectively, regardless of meter size (i.e. spoolpiece size). A fluid, typically natural gas, flows in a direction 150 with a velocity profile 152. Velocity vectors 153–158 indicate that the gas velocity through spool piece 100 increases as centerline 105 of spoolpiece 100 is approached.

Transducers 120 and 130 are ultrasonic transceivers, meaning that they both generate and receive ultrasonic signals. "Ultrasonic" in this context refers to frequencies above about 20 kilohertz. Typically, these signals are generated and received by a piezoelectric element in each transducer. To generate an ultrasonic signal, the piezoelectric element is stimulated electrically, and it responds by vibrating. This vibration of the piezoelectric element generates an ultrasonic signal that travels across the spoolpiece to the corresponding transducer of the transducer pair. Similarly, upon being struck by an ultrasonic signal, the receiving piezoelectric element vibrates and generates an electrical signal that is detected, digitized, and analyzed by electronics associated with the meter.

Initially, D ("downstream") transducer 120 generates an ultrasonic signal that is then received at, and detected by, U ("upstream") transducer 130. Some time later, U transducer 130 generates a return ultrasonic signal that is subsequently received at and detected by D transducer 120. Thus, U and D transducers 130 and 120 play "pitch and catch" with ultrasonic signals 115 along chordal path 110. During operation, this sequence may occur thousands of times per minute.

The transit time of the ultrasonic wave 115 between transducers U 130 and D 120 depends in part upon whether the ultrasonic signal 115 is traveling upstream or downstream with respect to the flowing gas. The transit time for an ultrasonic signal traveling downstream (i.e. in the same direction as the flow) is less than its transit time when traveling upstream (i.e. against the flow). In particular, the transit time $t_1$ of an ultrasonic signal traveling against the fluid flow and the transit time $t_2$ of an ultrasonic signal travelling with the fluid flow may be defined:

$$t_1 = \frac{L}{c - V\frac{x}{L}} \qquad (1)$$

$$t_2 = \frac{L}{c + V\frac{x}{L}} \qquad (2)$$

where, c = speed of sound in the fluid flow;
V = average axial velocity of the fluid flow over the chordal path in the axial direction;
L = acoustic path length;
x = axial component of L within the meter bore;
$t_1$ = transmit time of the ultrasonic signal against the fluid flow; and
$t_2$ = transit time of the ultrasonic signal with the fluid flow.

The upstream and downstream transit times can be used to calculate the average velocity along the signal path by the equation:

$$V = \frac{L^2}{2x} \frac{t_1 - t_2}{t_1 t_2} \qquad (3)$$

with the variables being defined as above.

The upstream and downstream travel times may also be used to calculate the speed of sound in the fluid flow according to the equation:

$$c = \frac{L}{2}t_1 + \frac{t_2}{t_1 t_2} \quad (4)$$

To a close approximation, equation (4) may be restated as:

$$V = \frac{c^2 \Delta t}{2x} \quad (5)$$

where, $$\Delta t = t_1 - t_2 \quad (6)$$

So to a close approximation at low velocities, the velocity v is directly proportional to $\Delta t$.

Given the cross-section measurements of the meter carrying the gas, the average velocity over the area of the meter bore may be used to find the volume of gas flowing through the meter or pipeline 100.

In addition, ultrasonic gas flow meters can have one or more paths. Single-path meters typically include a pair of transducers that projects ultrasonic waves over a single path across the axis (i.e. center) of spoolpiece 100. In addition to the advantages provided by single-path ultrasonic meters, ultrasonic meters having more than one path have other advantages. These advantages make multi-path ultrasonic meters desirable for custody transfer applications where accuracy and reliability are crucial.

Referring now to FIG. 1B, a multi-path ultrasonic meter is shown. Spool piece 100 includes four chordal paths A, B, C, and D at varying levels through the gas flow. Each chordal path A–D corresponds to two transceivers behaving alternately as a transmitter and receiver. Also shown is an electronics module 160, which acquires and processes the data from the four chordal paths A–D. This arrangement is described in U.S. Pat. No. 4,646,575, the teachings of which are hereby incorporated by reference. Hidden from view in FIG. 1B are the four pairs of transducers that correspond to chordal paths A–D.

The precise arrangement of the four pairs of transducers may be more easily understood by reference to FIG. 1C. Four pairs of transducer ports are mounted on spool piece 100. Each of these pairs of transducer ports corresponds to a single chordal path of FIG. 1B. A first pair of transducer ports 125 and 135 includes transducers 120 and 130 recessed slightly from the spool piece 100. The transducers are mounted at a non-perpendicular angle θ to centerline 105 of spool piece 100. Another pair of transducer ports 165 and 175 including associated transducers is mounted so that its chordal path loosely forms an "X" with respect to the chordal path of transducer ports 125 and 135. Similarly, transducer ports 185 and 195 are placed parallel to transducer ports 165 and 175 but at a different "level" (i.e. a different radial position in the pipe or meter spoolpiece). Not explicitly shown in FIG. 1C is a fourth pair of transducers and transducer ports. Taking FIGS. 1B and 1C together, the pairs of transducers are arranged such that the upper two pairs of transducers corresponding to chords A and B form an X and the lower two pairs of transducers corresponding to chords C and D also form an X.

Referring now to FIG. 1B, the flow velocity of the gas may be determined at each chord A–D to obtain chordal flow velocities. To obtain an average flow velocity over the entire pipe, the chordal flow velocities are multiplied by a set of predetermined constants. Such constants are well known and were determined theoretically.

Because the measurement of gas flow velocity and speed of sound depend on measured transit time, t, it is important to measure transit time accurately. One method and apparatus for measuring the time of flight of a signal is disclosed in U.S. Pat. No. 5,983,730, issued Nov. 16, 1999, entitled "Method and Apparatus for Measuring the Time of Flight of A Signal", which is hereby incorporated by reference for all purposes.

A difficulty that arises in measuring a time of flight exactly is defining when an ultrasonic waveform is received. For example, a detected waveform corresponding to a received ultrasonic signal may look like that shown in FIG. 2. The precise instant this waveform is deemed to have arrived is not altogether clear. One method to define the arrival instant is to define it as a zero crossing that follows a predefined voltage threshold value for the waveform. However, signal degradation due to pressure fluctuations for example may cause the correct zero crossing to be misidentified, as shown in FIG. 3 (not to scale). Other methods for identifying arrival time may also be used, but each is also subject to measurement error by misidentification of the proper arrival time.

Further, regardless of the method of measuring arrival time, adaptive methods are known that modify the measurement criterion or criteria values during measurement of the ultrasonic signals. These methods were developed to be more accurate than other methods of measuring arrival time but nonetheless still suffer from misidentification of the ultrasonic signal arrival time, leading to measurement errors. Further, because of the adaptive nature of the identification method, the misidentification tends to be "locked in", where the detection algorithm tends to lock in the mistake so that it happens time after time after time.

Although the misidentification of the arrival time of ultrasonic signals has long been known, previous approaches to identifying peak switching errors are inadequate. For example, ultrasonic meters generally provide a speed of sound reading for the gas flow through the meters. This speed of sound calculation varies with error in the peak selection. However, the variation in the speed of sound measurement is small and may be difficult to identify directly. In addition, the variation tends to get smaller as the meter size increases, making uniform diagnostics nearly impossible.

There therefore exists a need for a method or ultrasonic meter that eliminates misidentification of the arrival time of ultrasonic signals. Ideally, such a method or meter would be compatible with existing meters. It would also be ideal if such a method or meter were inexpensive to implement.

SUMMARY OF THE INVENTION

A method to detect a peak selection error in a waveform includes measuring a first average transit time for one or more ultrasonic signals along a first path in a meter, measuring a second average transit time for one or more ultrasonic signals along a second path in the meter (where the first and second paths are of different lengths) and determining whether there exists a peak selection error based on the length of the first path, the length of the second path, the first average transit time, and the second average transit time.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1A:
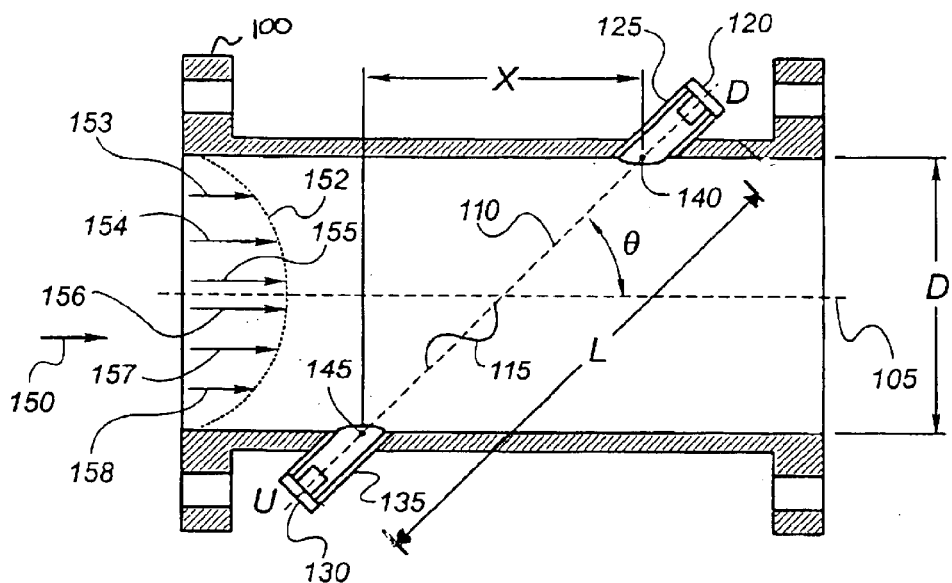
FIG. 1A is a cut-away top view of an ultrasonic gas flow meter.
Figure 1B:
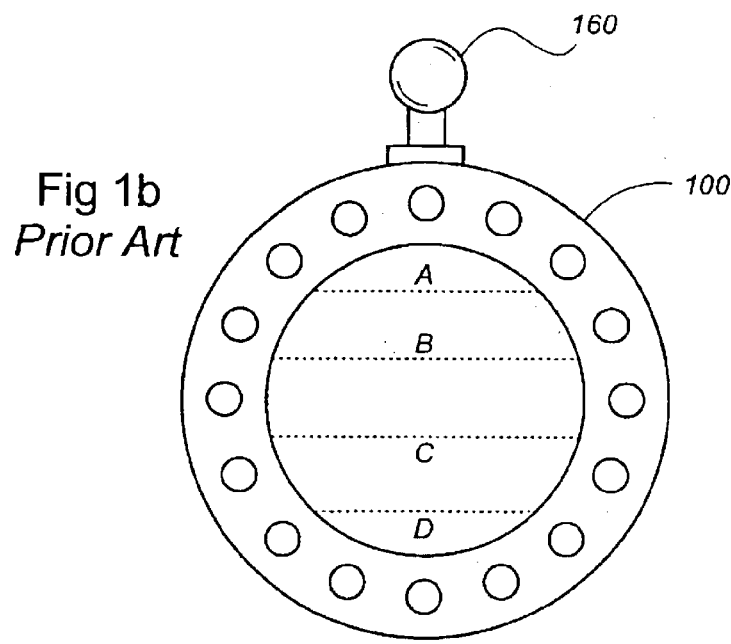
FIG. 1B is an end view of a spoolpiece including chordal paths A–D.
Figure 1C:
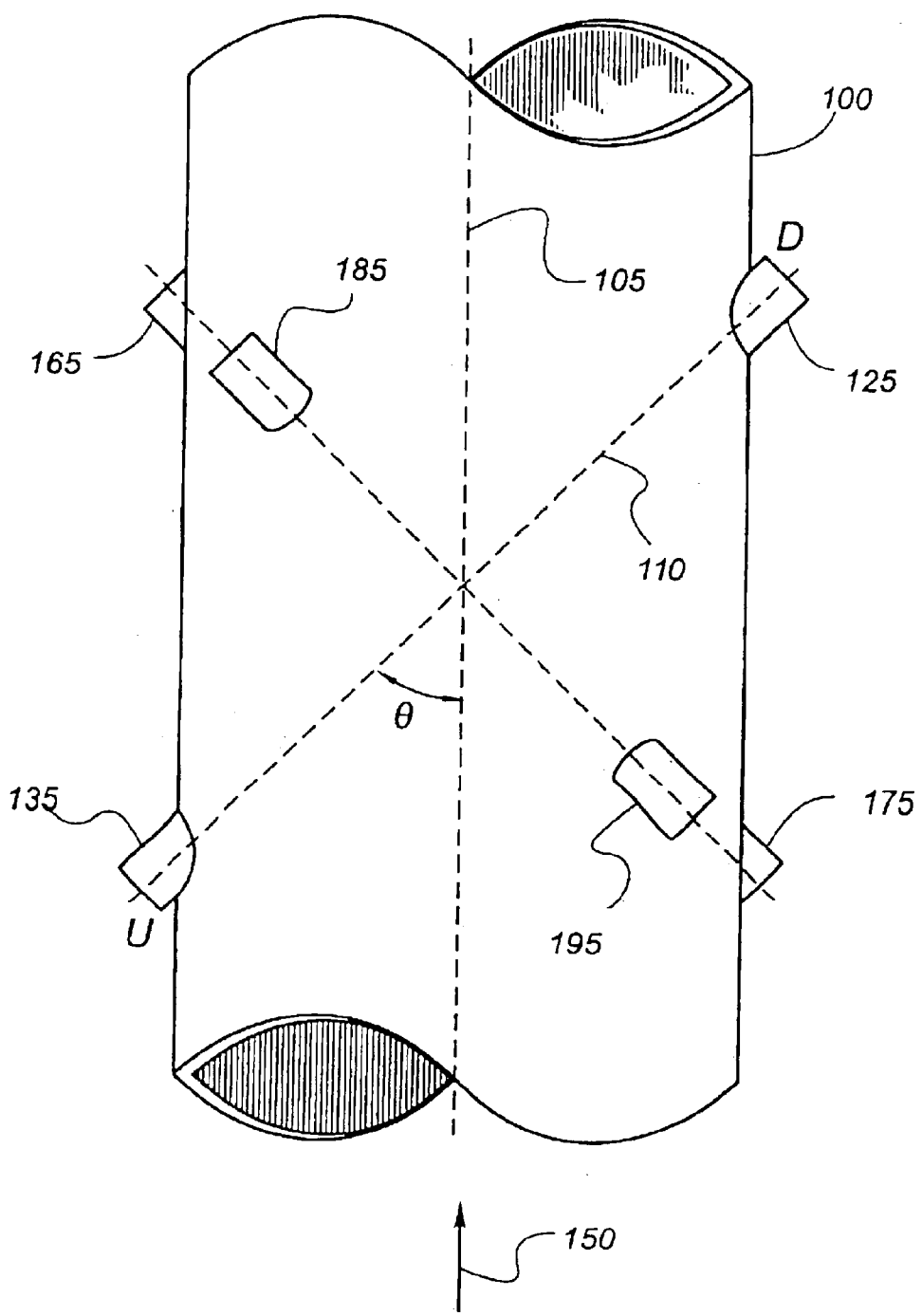
FIG. 1C is a top view of a spoolpiece housing transducer pairs.
Figure 2:
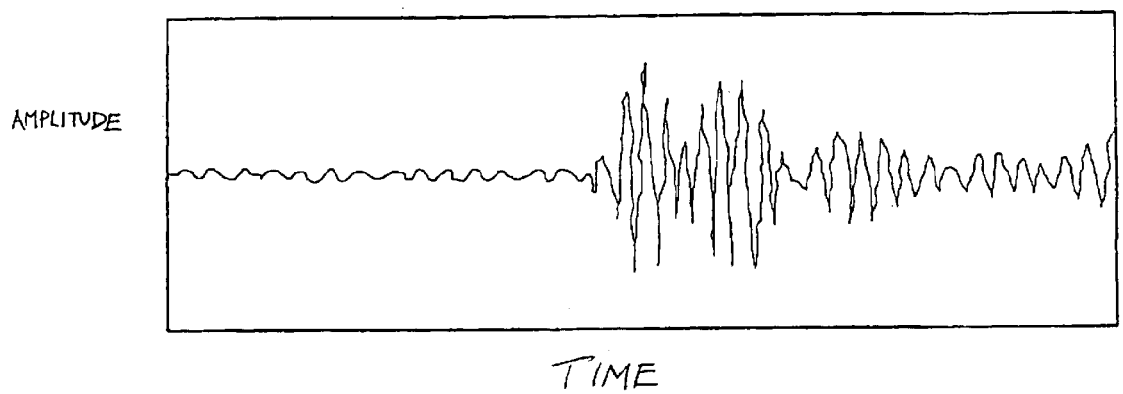
FIG. 2 is a first exemplary received ultrasonic waveform.

A first embodiment of the invention is a method and variants thereof for detecting time of arrival errors for ultrasonic signals. A second embodiment is electronics or hardware implementing such methods. For example, a processor or microprocessor associated with an ultrasonic meter as shown in FIG. 1 might run a computer program embodying the disclosed method. Alternately, electronics might analyze data provided by an ultrasonic meter after the fact to determine whether an error was made in determining the measured time-of-flight.

For a chord A of known length $L_A$, it is known that an ultrasonic wave traveling at the speed of sound "c" through a homogeneous medium at zero flow in the meter traverses the length of the chord $L_A$ in time $t_A$. $t_A$ is also therefore the average transit time of the ultrasonic signal along chord A as fluid moves through the meter. $t_A$ may not be found, however, by simply averaging the upstream and downstream transit times. Instead, the value of $t_A$ may be found algebraically by the equation:

$$t_A = \frac{L_A}{c} \quad (7)$$

it follows that:

$$c = \frac{L_A}{t_A} \quad (8)$$

This is just as true for a second chord B, such that:

$$c = \frac{L_B}{t_B} \quad (9)$$

For various reasons, however, the measured gross transit time is not exactly the actual transit time of the signal. One reason, for example, that the two times differ is the delay time inherent in the electronics associated with each transducer.

If total measured time T is defined as:

$$T = t + \tau \quad (10)$$

where,
T=measured or gross transit time;
t=actual transit time; and
τ=delay time.

Then where the delay times are the same for chords A and B, it is known from equation (8) that:

$$c = \frac{L_A}{T_A - \tau} \quad (11)$$

It follows from knowledge that the speed of sound for the medium is the same at both chord "A" and chord "B" that:

$$L_A(T_B - \tau) = L_B(T_A - \tau) \quad (12)$$

and $$\tau = \frac{L_B T_A - L_A T_B}{L_B - L_A} \quad (13)$$

ΔL is defined as:

$$\Delta L = L_B - L_A \quad (14)$$

and it follows that:

$$\tau = \frac{L_B T_A}{\Delta L} - \frac{L_A T_B}{\Delta L} \quad (15)$$

with the variables being defined as above.

Of course the transducer delay time for chord A, $\tau_A$, and the transducer delay time for chord B, $\tau_B$, are not the same. However, these delay times are routinely measured for each pair of transducers at the manufacturing stage before the transducers are sent into the field. Since $\tau_A$ and $\tau_B$ are known, it is also well known and common practice to calibrate each meter to factor out transducer delay times for each ultrasonic signal. Effectively, $\tau_A$ and $\tau_B$ are then equal to zero and therefore the same. The only remaining component to transducer delay time is a misidentification of the arrival times for the ultrasonic signals as by peak selection errors. Since the measured transit time T is defined as the actual transit time, t, plus delay time, τ, actual transit time can be substituted for measured transit time T where there is no peak selection error to result in:

$$\frac{L_B t_A}{\Delta L} - \frac{L_A t_B}{\Delta L} = 0 \quad (16)$$

This equation can then be used as a diagnostic to establish whether an error exists in the peak selection. It is equation 16 that has general applicability to a broad range of ultrasonic meters and signal arrival time identification methods.

A variable η, may then be established:

$$\eta = \frac{L_B t_A}{\Delta L} - \frac{L_A t_B}{\Delta L} \quad (17)$$

where,
$L_A$=length of chord A;
$L_B$=length of chord B;
$t_A$=average transit time of ultrasonic signals traveling along chord A (corrected average measured transit time);
$t_B$=average transit time of ultrasonic signals traveling along chord B (corrected average measured transit time); and
$\Delta L = L_B - L_A$ (where chord B is longer than chord A).

If there is a misidentified peak, η≠0.

Figure 3:
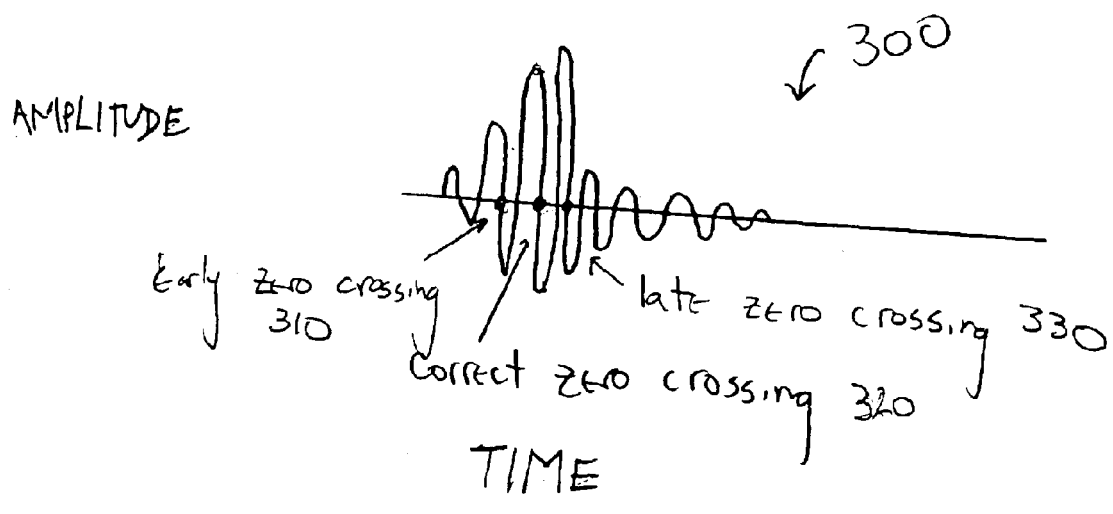
FIG. 3 is a second exemplary received ultrasonic waveform.

Let us examine the case where the "actual" peak in the received ultrasonic signal has been misidentified in chord A. Referring again to FIG. 3, an example ultrasonic wave form 300 is shown (not to scale). The "true" arrival time 320 is a zero crossing on the waveform as the waveform goes from positive to negative polarity. Of course, a processor or the like may mistakenly identify either early zero crossing 310 or late zero crossing 330 (or some other zero crossing) as the true or actual arrival time of the waveform. If the ultrasonic meter is operating at 125 kHz, for example, the period of the waveform is 8 μsec (microseconds). Therefore, for this frequency, any peak selection error is on the order of 8 μsec. Obviously, a peak selection error for another frequency will have a different value, depending on the period of the waveform. In any event, for an error in $t_A$, $$\eta = \frac{L_B}{\Delta L}(t_A + t_e) - \frac{L_A t_B}{\Delta L} \tag{18}$$

where, $\eta$=error indicator $L_A$, $L_B$=lengths of chords A, B;

$t_A$, $t_B$=average transit times across chords A, B at zero flow;

$\Delta L$=difference in the lengths of chords A and B; and $t_e$=error in transit time.

This is equivalent to:

$$\eta = \frac{L_B t_A}{\Delta L} - \frac{L_A t_B}{\Delta L} + \frac{L_B}{\Delta L} t_e \tag{19}$$

From equation (16), it is known that $$\frac{L_B t_A}{\Delta L} - \frac{L_A t_B}{\Delta L} = 0$$

such that $$\eta = \frac{L_B}{\Delta L} t_e \tag{20}$$

Figure 4:
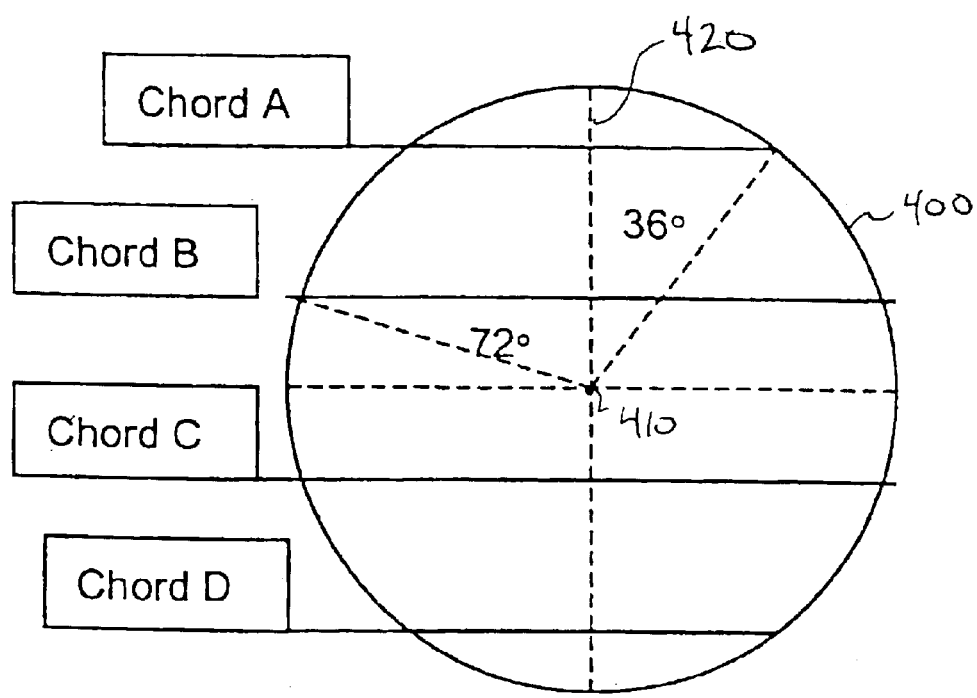
FIG. 4 is an end view of a four-chord ultrasonic meter showing angular relationships between chords.

Based on the value of $\eta$, it can be inferred whether there has been misidentification of the arrival time. These equations may be adapted to any particular meter. For example, referring to FIG. 4, there is shown a schematic end-view of an ultrasonic meter. The meter housing 400 includes chord A, chord B, chord C, and chord D. A central or longitudinal axis is represented at the center of the housing by a center point 410. A vertical axis 420 intersects center point 410. A line drawn from the center point at an angle of 36° from the vertical axis 420 intersects both chord A and the meter housing 400. A line drawn from the center point 410 at an angle of 72° from the vertical axis 420 intersects both chord B and the meter housing 400. Assuming an ideal meter that has the transducer with no setback from bore, according to this:

$$L_B = \sqrt{2} \, D \, \sin(72); \text{ and} \tag{21}$$

$$L_A = \sqrt{2} \, D \, \sin(36)$$

where, $L_A$=length of chord A;

$L_B$=length of chord B; and

D=meter diameter

Therefore:

$$\frac{L_B}{L_A} = 1.618034 \tag{22}$$

$$\frac{L_A}{\Delta L}$$

may be expressed as $L_A/(L_B-L_A)$. Multiplying by $$\frac{1/L_A}{1/L_A}$$

results in $$\frac{1}{(L_B/L_A - 1)}.$$

Substituting 1.618034 for $L_B/L_A$ results in:

$$\frac{L_A}{\Delta L} = 1.618 \tag{23}$$

Similarly, $$\frac{L_B}{\Delta L}$$

may be expressed as $L_B/(L_B-L_A)$. Multiplying by $$\frac{1/L_A}{1/L_A}$$

results in $$\frac{L_B/L_A}{(L_B/L_A - 1)}$$

Substituting 1.618 for $L_B/L_A$ results in:

$$\frac{L_B}{\Delta L} = 2.618 \tag{24}$$

Obviously, where there is a different angular (or bounce path) relationship between or among the chords, the value of these ratios will differ.

Assuming no effect from any recess of the transducers from the perfect circle of the theoretical meter, the above values for $L_A/\Delta L$ and $L_B/\Delta L$ are independent of meter size. This assumption is largely accurate, with the ratios $L_A/\Delta L$ and $L_B/\Delta L$ varying with meter size due to recess of the transducers back from the spoolpiece-housing. This variation is greater the smaller the meter.

Because τ was defined as zero above as being calibrated or factored out from the meter, and because $L_B/\Delta L$ is equal to 2.618 as shown above with respect to equation (20), the equation simplifies to:

$$\eta = 2.618 t_e \tag{25}$$

If the misidentified peak is one zero crossing away from the "true" zero crossing (the most common occurrence), the value for η is plus or minus 21 μsec, depending on whether misidentified zero crossing is earlier in time than the true zero crossing (in which case the value for η is negative) or is later in time than the true or correct zero crossing (in which case the value for η is positive). More generally, $$\eta = 2.618E_A - 1.618E_B \quad (26)$$

where, $E_A$=the error in $t_A$; and
$E_B$=the error in $t_B$.
If $E_B=0$ and $E_A=+/-8$ μs, then η=+/−21 μs;
If $E_A=0$ and $E_B=+/-8$ μs, then η=+/−13 μs;
If $E_B=E_A=+/-8$ μs, then η=+/−8 μs.

With normal manufacturing tolerances, the errors $E_B$ and $E_A$ are on the order of +/−1 μs, which implies an η of about +/−3 μs. So long as the error from manufacturing tolerances, multiplied by the maximum L/ΔL value (e.g. 2.618) is less than one period of the ultrasonic waveform, any error measurement less than some predetermined value can be discarded as mere manufacturing tolerance. For example, the predetermined value may be any value less than one period such as in this case 4 μsec. Thus the η test can separate peak switching errors from manufacturing tolerances.

The above derivation is based on an assumption of zero flow through the meter. Of course, in a real-world application, the assumption of a homogeneous medium is not necessarily true at very low velocities, due to stratification and convection. At high flow rates, turbulence and pressure surges disturb the homogeneity of the medium. Consequently, use of these exact equations may present challenges that would best be avoided. The preferred embodiment implements the underlying theory of this method by use of the measured speed of sound, c.

It is preferred that $t_A$ be based on the average of a batch of upstream and downstream measurements for chord A. Similarly, $t_B$ should be based on the average of a batch of upstream and downstream transit time measurements for chord B. However, we already know from equation (7) that $t_A=L_A/c_A$ and $t_B=L_B/c_B$. It follows that:

$$\eta = \frac{L_B L_A (c_B - c_A)}{\Delta L c_A c_B} \quad (27)$$

where,

η=error indicator
$L_A$, $L_B$=lengths of chords A and B;
$c_A$, $c_B$=values for speed of sound measured by chords A and B; and ΔL=difference in the lengths of chords A and B.

This calculation presents an additional advantage. Of course, ultimately this computation is based on the same variables as the earlier equations. But because a standard ultrasonic meter such as that sold by the assignee already calculates speed of sound for each chord, a value for η may be easily computed based on already known or computed information.

Figure 5:
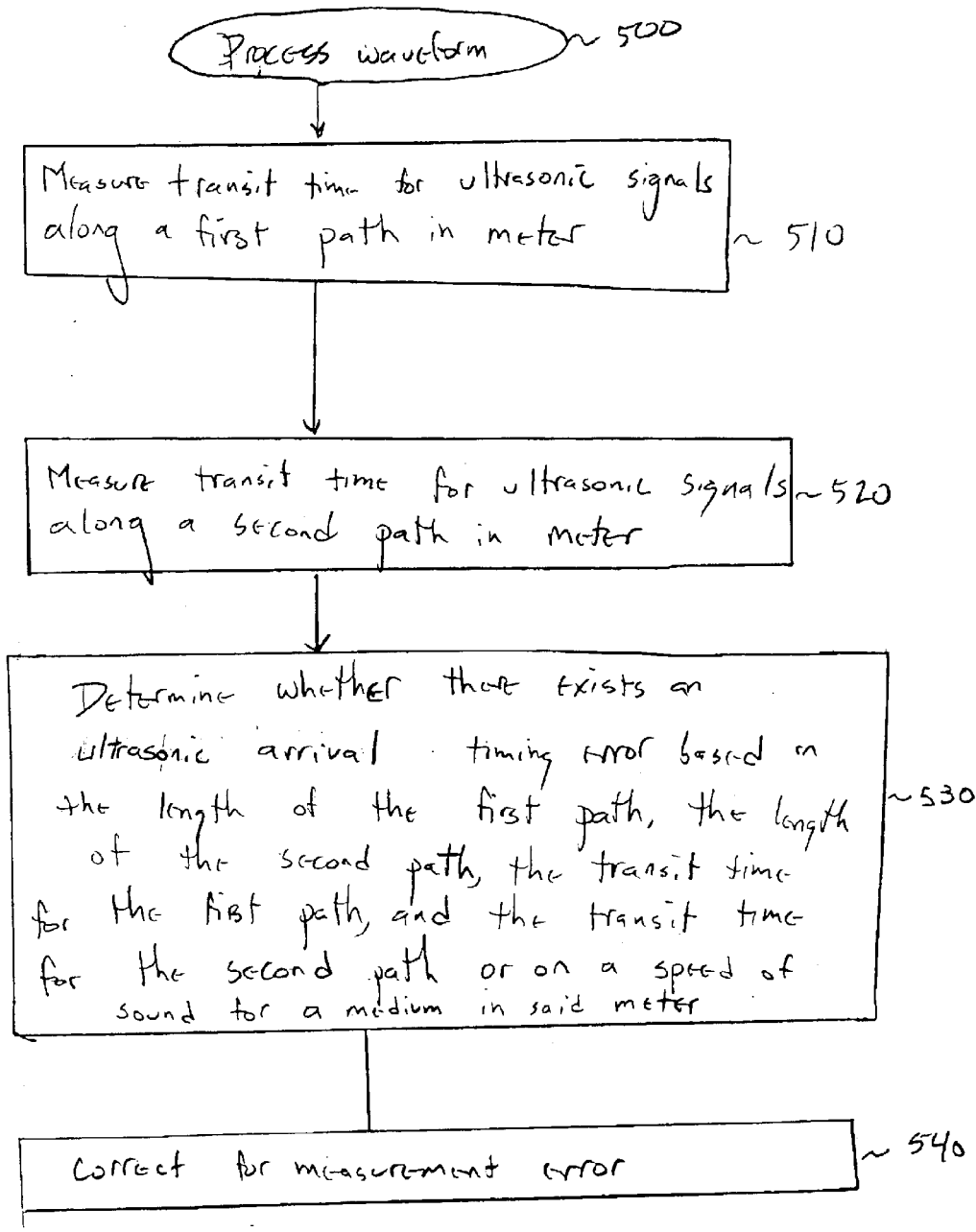
FIG. 5 is flow chart of one method according to the invention.

FIG. 5 is a flow chart of a method according to one embodiment of the invention. A method to detect a peak selection error in a waveform includes preprocessing of the wave form (e.g. filtering and digitizing the waveform) at step 500, measuring a first average transit time for one or more ultrasonic signals along a first path in a meter at step 510, measuring a second average transit time for one or more ultrasonic signals along a second path in the meter at step 520, where the first and second paths are of different lengths, and determining whether there exists a peak selection error based on the length of the first path, the length of the second path, the first average transit time, and the second average transit time at step 530. Additional steps may also be added. For example, at step 540 the measurement error may be corrected for by knowledge of the magnitude and direction or polarity of the error either by correction after the fact or by "on the fly" correction. If the value of η is positive, the error occurs in the later in time direction. If the value of η is negative, the error occurs in the earlier in time direction.

In a four-chord meter, this η comparison test can also be made between chords A and C, D and C, and D and B because each of these pairs of chords is comprised of different-length chords. The four values of η can then be used to pinpoint and correct the peak switching error.

Another application is to check that the time-of-flight measurement is correct. For example, the check on time of flight measurement may be used where a zero crossing method of measuring the arrival time of an ultrasonic signal is not used.

It should be noted that the invention is applicable not only to a four-chord ultrasonic meter as shown above but also to other meter designs including bounce-path ultrasonic meters (so long as those meters have at least two chords of differing lengths). The use of nomenclature such as $L_A$ and $L_B$ should not be construed to limit the invention to a particular set of chords. The invention may be used with any chords in an ultrasonic meter. It should also be noted that the invention is not limited to zero-crossing points, and could also be applied to peak selection points or any other points on the waveform where the picking errors are relatively constant. The invention can also be used to verify accurate time measurement within some tolerance regardless of the method of measuring time of arrival (although the indication may be weaker or stronger than with zero crossing methods).

While preferred embodiments of this invention have been shown and described, modifications thereof can be made by one skilled in the art without departing from the spirit or teaching of this invention. The embodiments described herein are exemplary only and are not limiting. For example, the invention applies equally well to digitized signals as analog signals. Many variations and modifications of the system and apparatus are possible and are within the scope of the invention. For example, the invention applies to any ultrasonic data originating from two or more chords having differing lengths and is not limited to the disclosed four chord meter. Accordingly, the scope of protection is not limited to the embodiments described herein, but is only limited by the claims which follow, the scope of which shall include all equivalents of the subject matter of the claims.

What is claimed is:

1. A method to detect a peak selection error in a waveform, comprising:
   a) measuring a first average transit time for one or more ultrasonic signals along a first path in a pipeline;
   b) measuring a second average transit time for one or more ultrasonic signals along a second path in said pipeline, said second path being of different length than said first path;
   c) determining whether there exists a peak selection error based on the length of said first path, the length of said second path, said first average transit time, and said second average transit time.

2. The method of claim 1, further comprising:
d) computing the size and direction of said peak selection error.

3. The method of claim 1, further comprising:
d) computing the size and direction of said peak selection error,
e) correcting for said peak selection error.

4. The method of claim 1, wherein there exists a peak selection error when a variable $\eta$ has an absolute value greater than a predetermined value, $\eta$ being defined according to the equation:

$$\eta = \frac{L_B t_A}{\Delta L} - \frac{L_A t_B}{\Delta L}$$

where,
$L_A$=length of chord A;
$L_B$=length of chord B;
$t_A$=average transit time of ultrasonic signals traveling along chord A (corrected average measured transit time);
$t_B$=average transit time of ultrasonic signals traveling along chord B (corrected average measured transit time); and
$\Delta L = L_B - L_A$.

5. The method of claim 1, wherein said length of said first path, the length of said second path, said first average transit time, and said second average transit time are used to calculate first and second speeds of sound for a medium in said pipeline, said step of determining whether a peak selection error exists being determined from said first and second speed of sound calculations.

6. The method of claim 1, wherein there exists a peak selection error when a variable $\eta$ has an absolute value greater than a predetermined value, $\eta$ being defined according to the equation:

$$\eta = \frac{L_B L_A (c_B - c_A)}{\Delta L c_A c_B}$$

where,
$\eta$=error indicator
$L_A$, $L_B$=lengths of chords A and B;
$C_A$, $C_B$=values for speed of sound measured by chords A and B; and
$\Delta L = L_B - L_A$.

7. The method of claim 4, wherein said predetermined value is less than one period of the ultrasonic signal.

8. The method of claim 4, wherein the direction of said error is indicated by whether $\eta$ is positive or negative.

9. The method of claim 6, wherein said predetermined value is less than the duration of one period for the ultrasonic signals.

10. An ultrasonic metering system, comprising:
a first transducer pair defining a first ultrasonic path having a first path length;
a second transducer pair defining a second ultrasonic path having a second path length;
one or more processors associated with said first and second transducer pairs, said one or more processors suitable to determine a first average transit time measurement for ultrasonic signals across said first ultrasonic path and a second average transit time measurement for ultrasonic signals across said second ultrasonic path, wherein said processor is programmed to identify transit time arrival measurement errors in said first and second transit time measurements.

11. The ultrasonic metering system of claim 10, wherein said processor identifies said measurement errors using said first transit time measurement, said second transit time measurement, said first path length, and said second path length.

12. The ultrasonic metering system of claim 10, wherein said processor is programmed according to the equation:

$$\eta = \frac{L_B t_A}{\Delta L} - \frac{L_A t_B}{\Delta L}$$

where,
$L_A$=length of chord A;
$L_B$=length of chord B;
$t_A$=average transit time of ultrasonic signals traveling along chord A (corrected average measured transit time);
$t_B$=average transit time of ultrasonic signals traveling along chord B (corrected average measured transit time); and
$\Delta L = L_B - L_A$.

13. The ultrasonic metering system of claim 10, wherein said processor is programmed according to the equation:

$$\eta = \frac{L_B L_A (c_B - c_A)}{\Delta L c_A c_B}$$

where,
$\eta$=error indicator
$L_A$, $L_B$=lengths of chords A and B;
$C_A$, $C_B$=values for speed of sound measured by chords A and B; and
$\Delta L = L_B - L_A$.

14. The ultrasonic metering system of claim 10, wherein said first and second ultrasonic paths reside in part in an ultrasonic meter installed on a pipeline.

15. The ultrasonic metering system of claim 10, there being a difference in said first path length and said second path length, said processors identifying said measurement errors in the first and second transit time measurements by using said difference.

16. The ultrasonic metering system of claim 10, wherein said processor is programmed to identify simultaneously measurement errors in said first and second transit time measurements.

17. The ultrasonic metering system of claim 11, wherein said processor is programmed according to the equation:

$$\eta = \frac{L_B t_A}{\Delta L} - \frac{L_A t_B}{\Delta L}$$

where,
$L_A$=length of chord A;
$L_B$=length of chord B;
$t_A$=average transit time of ultrasonic signals traveling along chord A (corrected average measured transit time);
$t_B$=average transit time of ultrasonic signals traveling along chord B (corrected average measured transit time); and
$\Delta L = L_B - L_A$.

18. The ultrasonic metering system of claim 11, wherein said processor is programmed according to the equation:

$$\eta = \frac{L_B L_A (c_B - c_A)}{\Delta L c_A c_B}$$

where, $\eta$=error indicator $L_A$, $L_B$=lengths of chords A and B;

$C_A$, $C_B$=values for speed of sound measured by chords A and B; and $\Delta L = L_B - L_A$.

19. The ultrasonic metering system of claim 11, wherein said processor computes said measurement errors based on a speed of sound computation and wherein said measurement error is corrected for.

20. The ultrasonic metering system of claim 13, wherein there exists a peak switching error if the absolute value of $\eta$ is greater than a predetermined value.

21. The ultrasonic metering system of claim 20, wherein said predetermined value is less than a single period of said ultrasonic signals divided by L/$\Delta$L where L is the length of a chord and $\Delta$L is the difference in lengths of two chords of interest.

* * * * *